United States Patent [19]

Hurlburt

[11] Patent Number: 4,652,043
[45] Date of Patent: Mar. 24, 1987

[54] ACCESS DOOR FOR HARVESTER OPERATOR'S CAB

[75] Inventor: Joseph C. Hurlburt, Lancaster, Pa.

[73] Assignee: New Holland Inc., New Holland, Pa.

[21] Appl. No.: 723,426

[22] Filed: Apr. 15, 1985

[51] Int. Cl.⁴ .............................................. B62D 33/06
[52] U.S. Cl. .................................. 296/190; 296/202; 296/146; 49/236
[58] Field of Search ................ 296/190, 146, 202; 49/236

[56] References Cited

U.S. PATENT DOCUMENTS 3,381,412  5/1968  Brotherson .......................... 49/236
4,368,797  1/1983  Van der Lely ...................... 296/190
4,440,437  4/1984  Hahm et al. ........................ 296/190

Primary Examiner—Robert R. Song
Attorney, Agent, or Firm—Larry W. Miller; Frank A. Seemar; Darrell F. Marquette

[57] ABSTRACT

An operator's cab for a self-propelled crop harvesting machine is disclosed wherein the access door is pivotally mounted on a forwardly inclined support post. The hinge axis for the access door is inclined in both a forward direction and in an inward direction toward an operator's station to permit the bottom frame member of the access door to swing in a substantially horizontal plane. The access door is pivotally movable between a closed position and a fully opened position which is approximately 90° of rotation apart. The hinge axis casts a vertical projection relative to the access door when the access door is rotated midway between the closed and fully opened positions so that the bottom frame member can be horizontally positioned in both the closed and fully opened positions without dropping below a horizontal plane.

13 Claims, 5 Drawing Figures

ACCESS DOOR FOR HARVESTER OPERATOR'S CAB

BACKGROUND OF THE INVENTION

The present invention relates generally to operator's cabs mounted on self-propelled crop harvesting machines, such as combines, and, more particularly, to a means for mounting a cab access door about a non-vertical support post, yet permit the access door to swing in a substantially horizontal plane.

Modern self-propelled crop harvesting machines are generally equipped with an enclosed operator's cab in which the operator is seated to control the harvesting operation of the machine. Such operator's cabs are generally provided with environmental controls, such as air conditioning and sound absorbing materials, to improve the quality of the work environment for the operator. Operator cabs are generally mounted at an elevated position on the crop harvesting machine to afford the operator a field of view of the harvesting operation relative to the gathering of crop material from the field in which he is operating. To permit this field of view, the cab enclosure is provided with a number of transparent panels, normally glass, supported from vertical posts extending between the floor member and the roof member of the cab. To permit access into the cab, the cab enclosure is provided with an access door mounted for pivotal movement about a hinge axis supported by one of the vertical support posts.

An inclination of support posts in forward and/or outward directions permits the transparent panels to be angled in such a manner as to reduce glare problems and provide an aesthetically pleasing appearance. Mounting the hinge axis for an access door on an inclined support post presents a problem for the opening of the access door under conditions where the cab and/or access ladder structural components present a constraint on vertical movements of the access door. For example, a forwardly inclined hinge axis would dictate movement of the bottom frame member of an access door through a non-horizontal plane that results in the bottom frame member being in a lower position when the door is opened than when it is closed. Accordingly, it would be desirable to provide a mounting configuration for an access door to enable the door to be mounted to an inclined support post yet enable the access door to swing about a substantially horizontal plane wherein the bottom frame member of the door is horizontal in both the closed and fully opened positions without dropping below the horizontal plane.

SUMMARY OF THE INVENTION

It is an object of this invention to overcome the aforementioned disadvantages of the prior art by providing a hinge apparatus for mounting an access door to an inclined support post to permit the door to rotate in a substantially horizontal plane.

It is another object of this invention to provide a door mounting structure for pivoting a door about a non-vertical hinge access in which the door will be in a horizontal orientation in both a closed and a fully opened position.

It is a feature of this invention that the hinge axis of the door mounting structure casts a vertical projection relative to the door when the door is midway between its closed and fully opened positions.

It is an advantage of this invention that the operator's cab can be utilized in a universal application on a plurality of crop harvesting machines.

It is another feature of this invention that the access door can be opened to its fully opened position without the bottom of the door dropping below a horizontal plane.

It is still another feature of this invention that the lower hinge member for mounting an access door is longer than the upper hinge member.

It is yet another feature of this invention that the bottom frame member of the access door travels through a slightly elevated arcuate path relative to a horizontal plane when the door is moved between a closed position and a fully opened position.

It is another advantage of this invention that the high point of the elevated arcuate path of the bottom door frame member corresponds to the mid-point between the closed and fully opened positions.

It is still another advantage of this invention that the movement of the access door between the closed and fully opened positions corresponds to approximately 90° of rotation.

It is a further object of this invention to provide a mechanism for mounting an access door to a support post inclined from a vertical orientation which is durable in construction, inexpensive of manufacture, carefree of maintenance, facile in assemblage, and simple and effective in use.

These and other objects, features and advantages are accomplished according to the instant invention by providing an operator's cab for a self-propelled crop harvesting machine wherein the access door is pivotally mounted on a forwardly inclined support post. The hinge axis for the access door is inclined in both a forward direction and in an inward direction toward an operator's station to permit the bottom frame member of the access door to swing in a substantially horizontal plane. The access door is pivotally movable between a closed position and a fully opened position which is approximately 90° of rotation apart. The hinge axis casts a vertical projection relative to the access door when the access door is rotated midway between the closed and fully opened positions so that the bottom frame member can be horizontally positioned in both the closed and fully opened positions without dropping below a horizontal plane.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
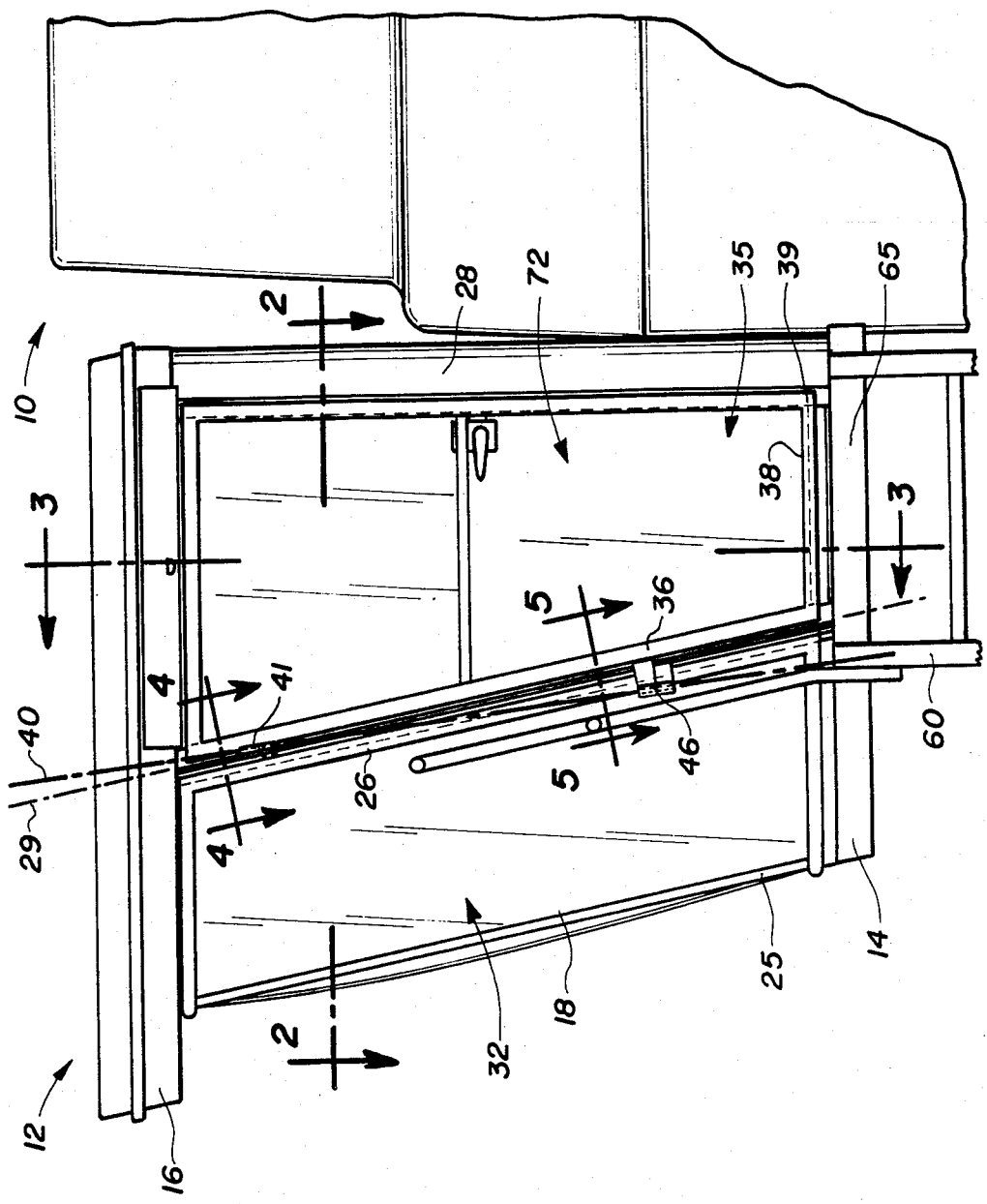
FIG. 1 is a side elevational view of an operator's cab mounted on a crop harvesting machine and incorporating the principles of the instant invention, the crop harvesting machine being fragmentarily shown.

Referring now to the drawings and, particularly, to FIG. 1, a side elevational view of the operator's cab mounted on a self-propelled crop harvesting machine, commonly referred to as a combine, can be seen. Any left and right references are used as a matter of convenience and are determined by standing at the rear of the machine, facing the forward end, the direction of travel. The self-propelled crop harvesting machine 10 is fragmentarily shown and represents a conventional combine harvester; however, one skilled in the art will readily realize that the principles of the instant invention will not be limited to the type of harvesting machine in which the operator's cab is mounted.

Figure 2:
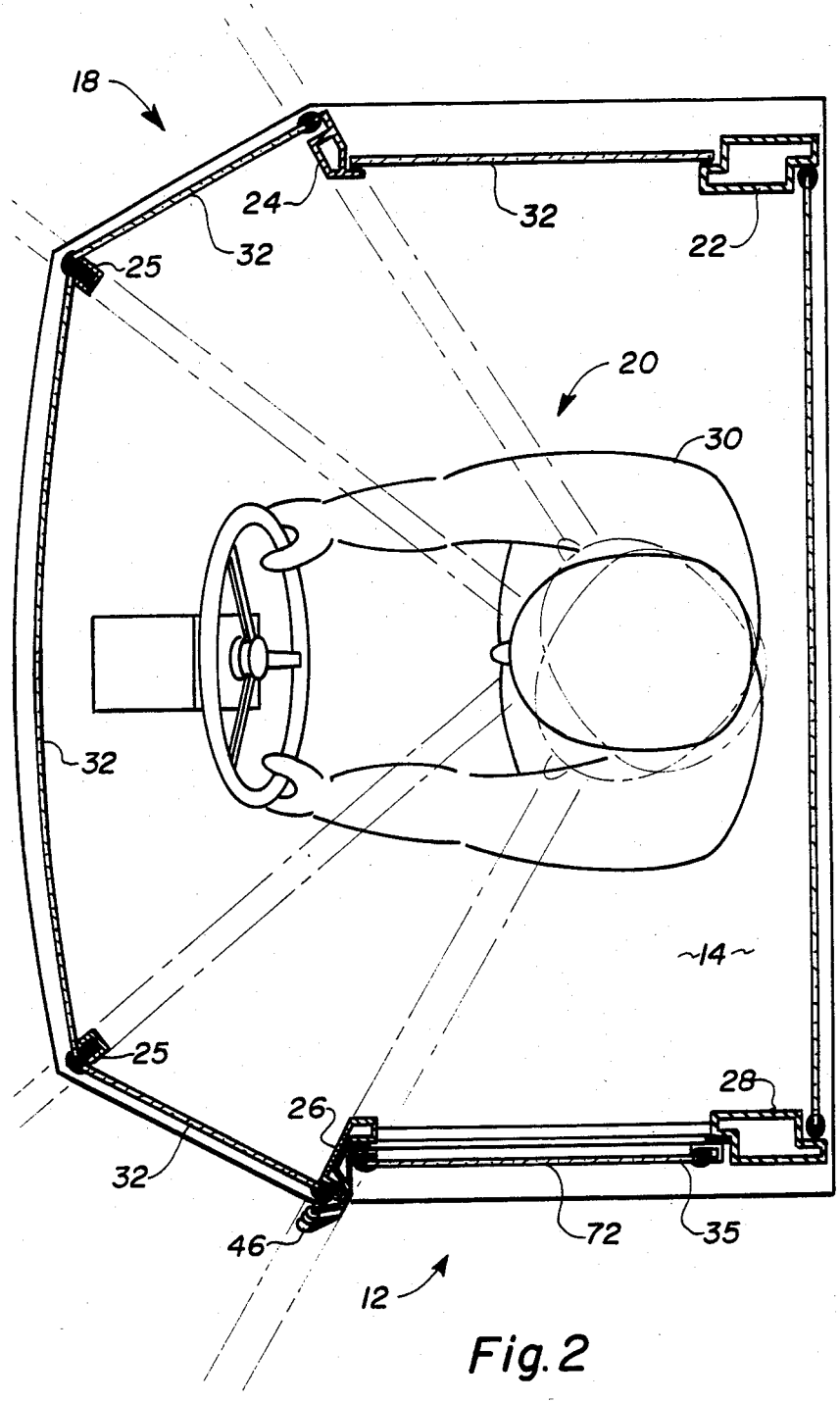
FIG. 2 is a horizontal cross-sectional view taken through the operator's compartment.

Referring to FIGS. 1 and 2, the structural details of the operator's cab 12 can best be seen. The cab 12 includes a floor member 14, a roof member 16 vertically spaced above the floor member 14 and an enclosure 18 extending around and encompassing an operator's station 20 located in the interior of the cab 12. Supporting the roof member 16 above the floor member 14 and at least partially supporting the enclosure 18, the operator's cab 12 is provided with a plurality of support posts; namely, a right rear support post 22, a right side post 24, two front support posts 25, a left side post 26 and a left rear support post 28, spaced around the periphery of the enclosure 18.

As best seen in FIG. 2, the operator 30 positioned at the operator's station 20 is provided with a field of vision extending radially from the right rear support post 22 to the left rear support post 28. To permit the operator 30 to observe the crop harvesting operation conventionally occurring in front of him, the enclosure 18 includes a plurality of transparent panels, normally glass, supported by various support posts 22,24,25,26,28. To gain access to the interior of the cab 12, the left side of the enclosure 18 is provided with an access door 35 pivotally connected to the left side post 26 and movable about a hinge axis 40.

Figure 3:
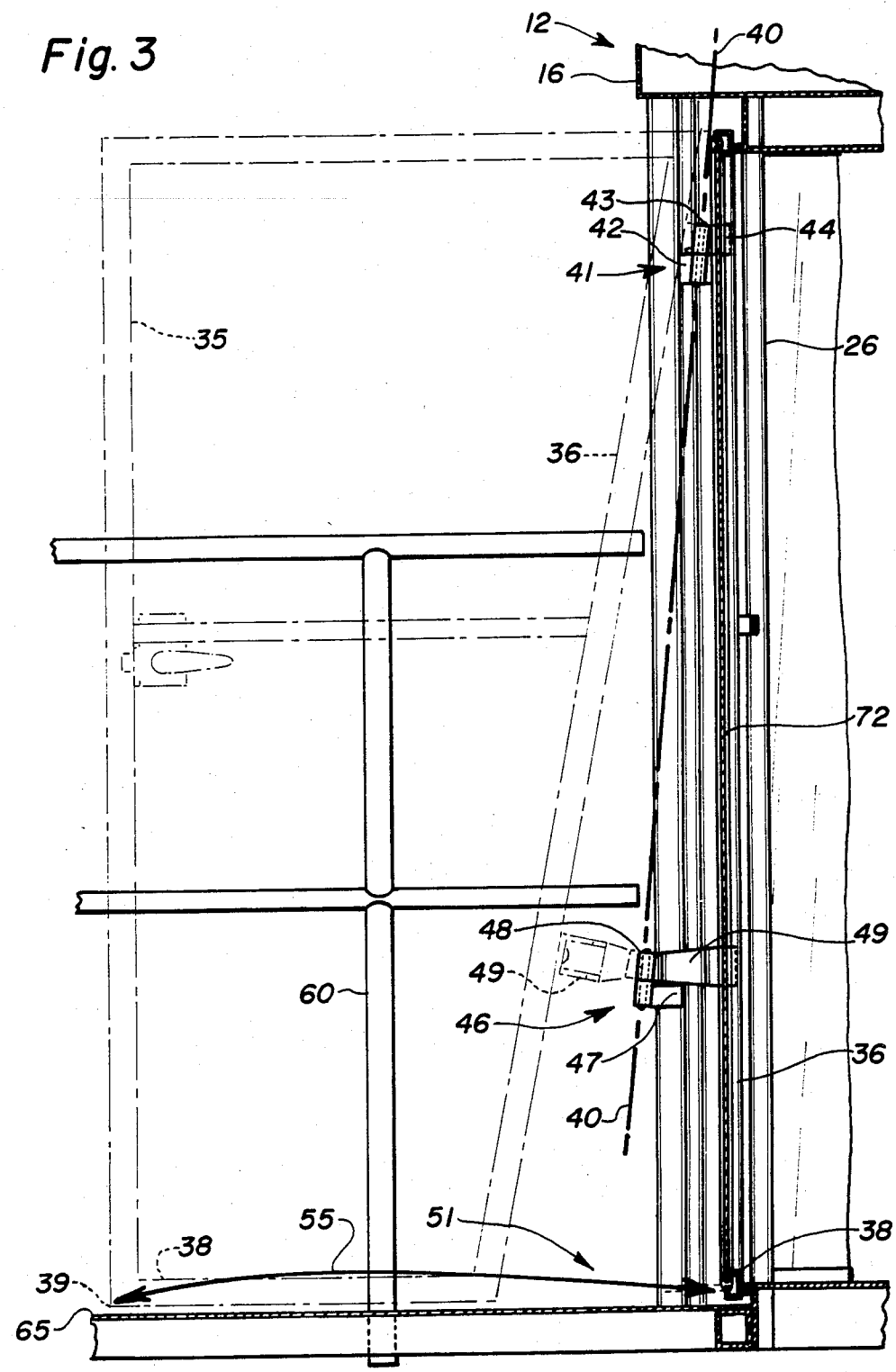
FIG. 3 is a partial cross-sectional view of the operator's cab taken through the access door and showing the inward inclination of the hinge axis, the fully opened position of the access door being shown in phantom.
Figure 4:
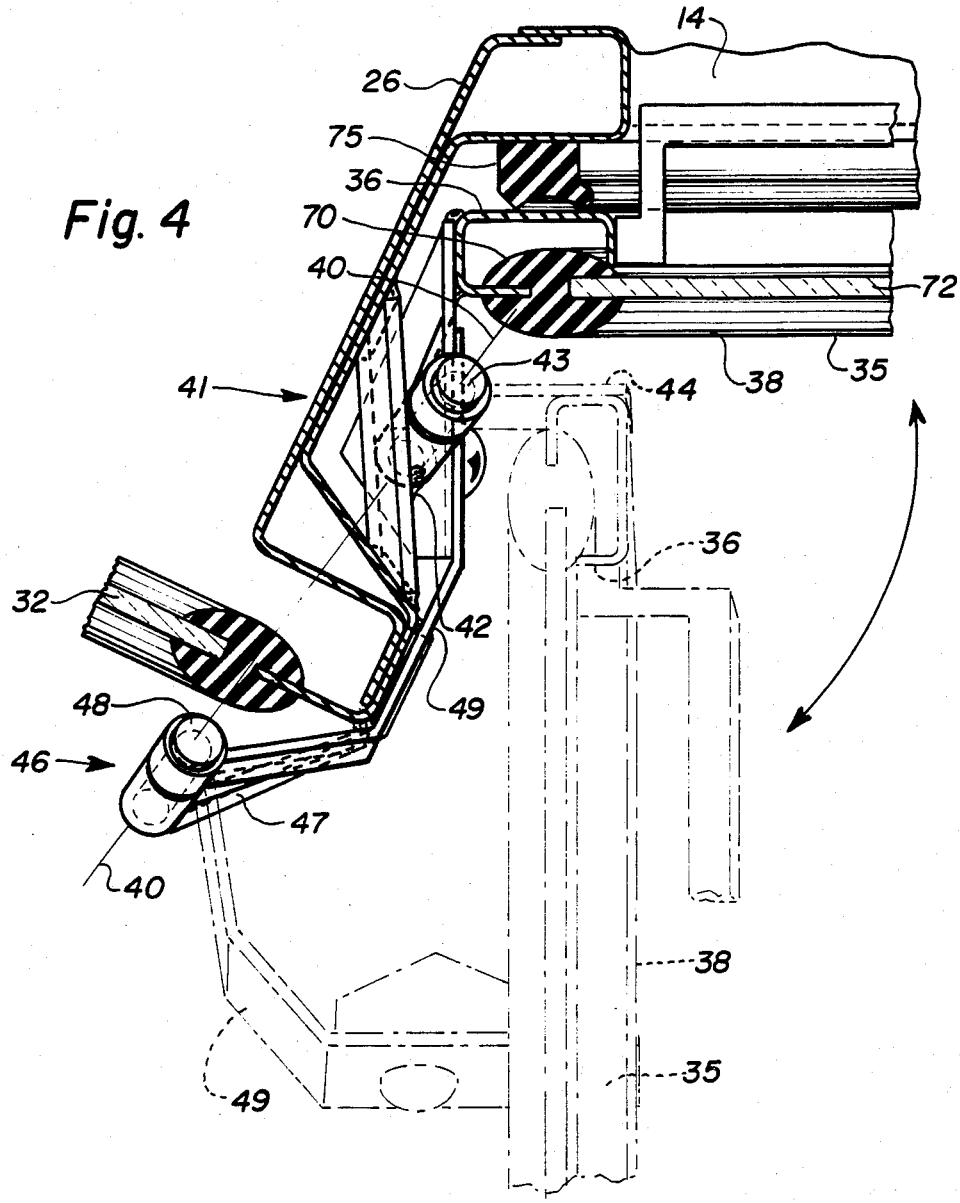
FIG. 4 is a partial cross-sectional view taken along lines 4—4 of FIG. 1 through the support post mounting the access door to show the upper and lower hinge members, the access door being shown in its closed position with the fully opened position being shown in phantom.
Figure 5:
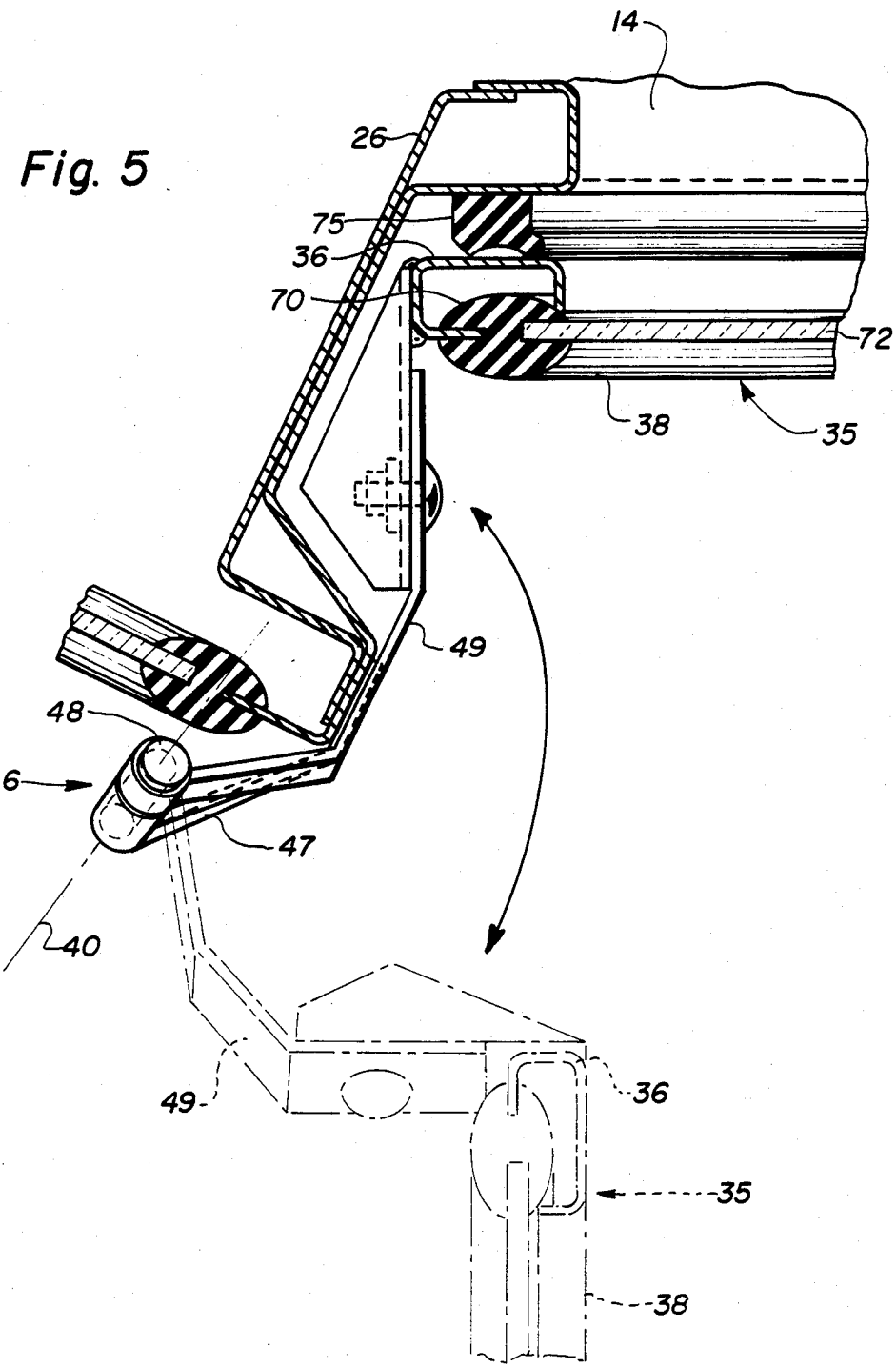
FIG. 5 is a partial cross-sectional view corresponding to lines 5—5 of FIG. 1 taken through the support posts mounting the access door to show the lower hinge member, the access door being shown in its closed position with the fully opened position being shown in phantom.

Referring now to FIGS. 1, 3, 4 and 5, it can be seen that the access door 35 is mounted to the left side post 26 by an upper hinge member 41 and a lower hinge member 46. Each hinge member 41,46 includes a first hinge strap 42,47, respectively, interconnecting a hinge joint 43,48, respectively, and the left side post 26. Each hinge member 41,46 is also provided with a second hinge strap 44,49, respectively, interconnecting the corresponding hinge joint 43,48 and the side frame member 36 of the access door 35. As is best seen in FIG. 3, the second hinge strap 49 of the lower hinge member 46 is longer than either of the strap members 42,44 of the upper hinge member 41. As a result, a large gap 51 is created between the bottom frame member 38 and the left side support post 26 when the access door 35 is moved into the fully opened position as seen in phantom in FIG. 3.

The side frame member 36 of the access door 35 is provided with a glazing element 70 supporting and retaining a transparent panel 72 to permit visibility through the door 35. The side frame member 36 engages a seal 75 affixed to the left side support post 26 to seal the door opening when the access door 35 is in the closed position. It should be realized by one skilled in the art that the access door 35 is provided with a frame member extending around the periphery of the door 35, as best seen in FIG. 1, and is engageable with the seal 75 which also extends around the door opening to sealingly engage the door 35 as part of the enclosure 18.

The hinge joints 43,48 are aligned to form a hinge axis 40 which is inclined both forwardly relative to vertical as seen in FIG. 1 and inwardly toward the operator's station 20 as seen in FIG. 3. Since the door 35 pivots about this inclined hinge axis 40, the bottom frame member 38 of the door 35 travels in an elevated arcuate path schematically indicated by the arrow 55 in FIG. 3. The bottom frame member 38 is substantially horizontal when the access door 35 is in the closed position as shown in FIG. 1. Likewise, the bottom frame member 38 is also in a substantially horizontal position when in the fully opened position shown in phantom in FIG. 3. Although the arcuate path 55 of the bottom frame member 38 is not truly horizontal, the angle of inclination of the hinge axis 40 is sufficiently small that the lower outside corner 39 of the access door 35 rises only slightly during the path of travel between the closed and fully opened positions and, therefore, is substantially horizontal. As can be seen in FIGS. 1 and 3, the inclination of the hinge axis 40 is different than the forward inclination angle 29 of the side support post 26. The hinge strap arrangement inclines the hinge axis 40, relative to vertical, forwardly, as seen in FIG. 1, approximately the same as the hinge axis 40 is inclined inwardly, as seen in FIG. 3.

The hinge members 41,46 are arranged to define the hinge axis 40 in such a manner that when viewed from the reference of the access door 35 during its pivotal movement from the closed position to the fully opened position, the hinge axis 40 casts a vertical projection when the access door 35 is midway between the closed and fully opened positions. As a result, the lower outside corner 39 of the access door 35 will rise the same distance from the closed position to the midway position as it falls from the midway position to the fully opened position. With this configuration, the bottom frame member 38 of the access door 35 can be horizontally positioned in both the closed and fully opened positions while traveling through a slight upward arc therebetween. Accordingly, the access ladder 60 can be constructed to have a platform 65 close to the level of the bottom frame member 38 of the access door 35 to eliminate the need for a step to enter the cab 12, as the access door 35 will not engage the platform 65 during its path of travel from the closed to the fully opened position, which amounts to approximately 90° of rotation. Also, the roof member 16 will not be engaged by the access door 35 during this slightly elevating path of travel.

It will be understood that changes in the details, materials, steps and arrangement of parts which have been described and illustrated to explain the nature of the invention, will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly, as well as in the specific form shown.

Having thus described the invention, what is claimed is:

1. An operator's cab for a crop harvesting machine comprising:
   a floor member having an operator's station supported thereon;
   a roof member spaced above said floor member;
   a plurality of support posts interconnecting said floor member and said roof member to support said roof member above said floor member, one of said support posts being inclined from a vertical plane; and
   an enclosure extending around said floor member and between said floor member and said roof member to enclose said operator's station, said enclosure being at least partially supported by said support posts and including an access door to permit access to said operator's station, said door having a bottom door frame member and being pivotally mounted to said inclined support post by a hinge assembly defining a hinge axis inclined from a vertical plane yet permitting said bottom door frame member to be pivotally moved through a substantially horizontal arc.

2. The operator's cab of claim 1 wherein said door is movable between a closed position and a fully opened position, said bottom door frame member being substantially horizontal when said door is in both said closed position and said fully opened position.

3. The operator's cab of claim 2 wherein said hinge axis is inclined at a different angle relative to a vertical plane than said inclined support post.

4. The operator's cab of claim 3 wherein said hinge axis is inclined both forwardly relative to said operator's station and inwardly toward said operator's station.

5. The operator's cab of claim 4 wherein said hinge assembly includes an upper hinge member and a lower hinge member, each said hinge member having first and second hinge straps pivotally connected at a hinge joint, each said first hinge strap being connected to said inclined support post and each said second hinge strap being connected to said access door, said lower second hinge strap being longer than either of said upper hinge straps.

6. The operator's cab of claim 4 wherein said bottom door frame member travels through an elevated arcuate path relative to a horizontal plane when said door moves between said closed position and said fully opened position, the high point of said arcuate path being midway between said closed position and said fully opened position.

7. The operator's cab of claim 6 wherein said closed position and said fully opened position are approximately 90 degrees of rotation apart.

8. In an operator's cab for a crop harvesting machine having a floor member supporting an operator's station; a roof member vertically spaced above said floor member; a plurality of support posts extending between said floor member and said roof member to support said roof member above said floor member, one of said support posts being inclined relative to a vertical plane; an enclosure extending around said floor member between said floor member and said roof member to enclose said operator's station, said enclosure including an access door permitting access to said operator's station, said access door having a bottom door frame member and being pivotally mounted by a hinge assembly defining a hinge axis, said access door being pivotally movable between a closed position and a fully opened position, the improvement comprising:
   said access door being mounted to said inclined support post by said hinge assembly, said hinge axis being inclined relative to a vertical plane yet having a vertical projection relative to said door when said door is pivotally moved to a position between said closed position and said fully opened position.

9. The operator's cab of claim 8 wherein said bottom door frame member travels through an elevated arcuate path when moving from said closed position to said fully opened position, said bottom door frame member being substantially horizontal in both said closed position and said fully opened position.

10. The operator's cab of claim 9 wherein said bottom door frame member is at the highest point along said arcuate path when said door is in said midway position a position substantially midway between said closed position and said fully opened position.

11. The operator's cab of claim 10 wherein said hinge assembly includes an upper hinge member and a lower hinge member, each said hinge member having first and second hinge straps pivotally connected at a hinge joint, each said first hinge strap being connected to said inclined support post and each said second hinge strap being connected to said access door, said lower second hinge strap being larger than either of said upper hinge straps.

12. The operator's cab of claim 11 wherein said hinge axis is inclined both forwardly and inwardly toward said operator's station.

13. The operator's cab of claim 12 wherein said closed position and said fully opened position correspond to approximately 90 degrees of rotation of said access door.

* * * * *